April 14, 1936.  B. B. BRADFORD  2,037,615

AUTOMOBILE WHEEL

Filed March 25, 1935

Brenton B. Bradford
INVENTOR

BY Victor J. Evans & Co.
ATTORNEY

Patented Apr. 14, 1936

2,037,615

UNITED STATES PATENT OFFICE 2,037,615

AUTOMOBILE WHEEL

Brenton B. Bradford, Fresno, Calif.

Application March 25, 1935, Serial No. 12,922

3 Claims. (Cl. 301—9)

This invention relates to demountable automobile wheels, and has for the primary object the provision of an improved securing means between the wheel and its mounting which is capable of easy and quick operation, to mount or demount the wheel without the use of a wrench or similar tool, only requiring the elevation of the wheel from the ground and a single manual actuation of said means to detach or attach the wheel to its mounting.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a wheel hub and a securing means therefor constructed in accordance with my invention.

Figure 1:
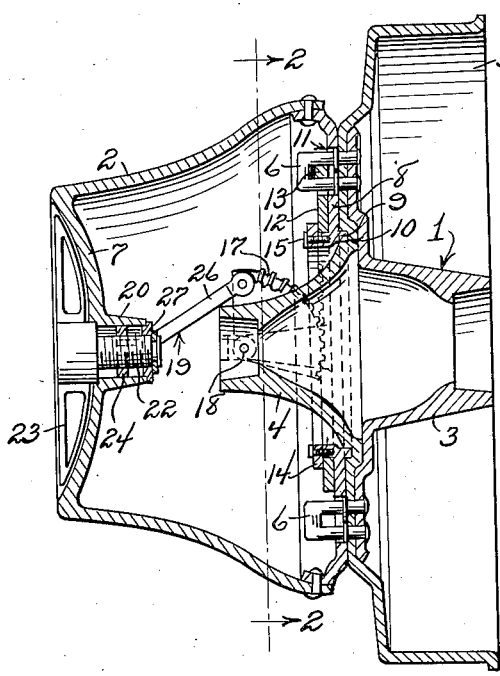
Figure 2:
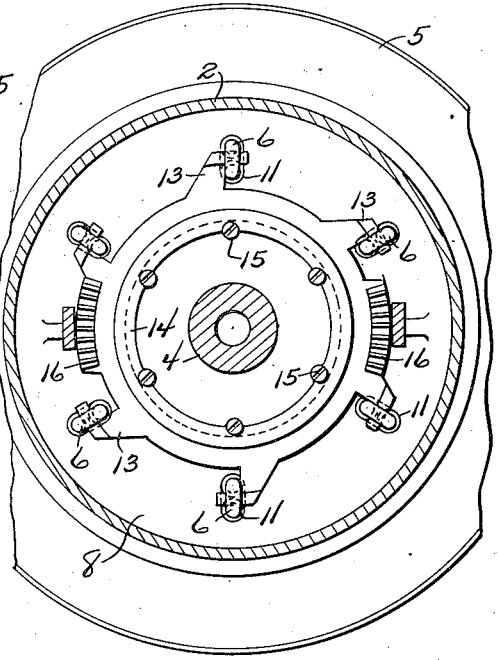
Figure 2 is a sectional view taken on the line 2—2 of Figure 1.
Figure 3:
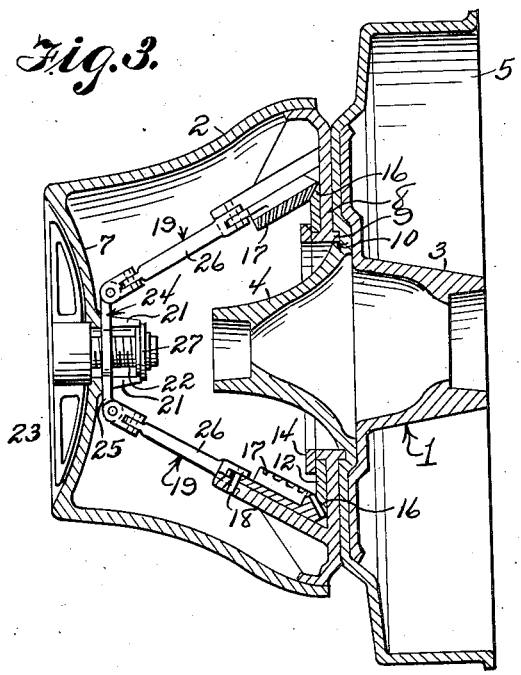
Figure 3 is a sectional view showing the securing means.
Figure 4:
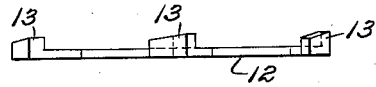
Figure 4 is an edge view illustrating an annular locking element.
Figure 5:
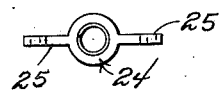
Figure 5 is an end view illustrating a feed nut.

Referring in detail to the drawing, the numeral 1 indicates an axle boxing and the character 2 indicates a wheel hub. The boxing 1 is adapted to be either journaled on an axle or keyed to an axle and in the present showing is of the type to receive axle bearings and includes sections 3 and 4, the section 4 having a brake drum 5 formed integrally therewith. The section 3 is secured to the section 4 by staples 6 acting as keepers and forming part of the present invention.

The outer end of the hub 2 is closed by a concaved wall 7 and the inner end of the hub has secured thereto a plate 8 carrying an annular flange 9 adapted to fit an annular groove 10 formed in the section 4 of the boxing 1. The plate 8 is provided with slots 11 through which the staples 6 project when the hub 2 is applied to the boxing. The plate 8 has a centrally arranged opening to permit the section 4 of the boxing to project into the hub. Journalled to the inner face of the plate 8 is an annular member 12 carrying upon its periphery lugs 13 adapted to be moved into or out of the staples or keepers whereby the hub may be efficiently secured to the boxing or detached therefrom when desiring to demount the wheel. The annular member 12 is removably mounted to the plate 8 by a ring-like member 14 detachably secured to the plate 8 by fasteners 15 and partially overlying said annular member 12.

The annular member 12 is adapted for a limited rotation in either direction which rotation is sufficient to engage and disengage the lugs with the keepers. Oppositely arranged racks 16 are formed on the periphery of the annular member 12 and are in mesh with segmental-shaped racks 17 pivoted to the hub, as shown at 18. The segmental racks are moved on their pivots in opposite directions for rotating the annular member 12 in opposite directions by an operating medium 19 carried by the hub 2.

The end wall 7 of the hub 2 has integral therewith a boxing 20 provided with slots 21 in opposite walls thereof. A feed stem 22 is journaled in the boxing and has secured to its outer end a handle 23 and has a feed nut 24 threaded thereto. The feed nut has integral therewith arms 25 extending through the slot 21 to which are pivoted links 26, the latter being in turn pivoted to the segmental-shaped racks 17. Thus it will be seen that by turning the handle 23 in one direction the segmental racks will be moved on their pivot in one direction to disengage the lugs from their keepers, thereby disengaging the lugs from the keepers 6 freeing the hub 2 from the boxing 1. The rotation of the handle in an opposite direction with the hub mounted to the boxing 1 will bring about movement of the lugs into the keepers thereby firmly attaching the hub to the boxing.

The handle 23 lies within the hub 2 due to the concaved wall 7 of the hub and the inner end of the feed stem is rotatably supported by a disc-like member 27 engaging the inner end of the boxing 20. The disc-like member 27 is removably secured to the stem whereby the stem and handle may be detached from the boxing 20 when desired.

A wheel equipped with a securing means of the character described may be readily mounted to or removed from an axle boxing without the employment of a wrench or similar tools, only requiring the actuation of the handle 23 to bring about detachment or attachment of the hub to the boxing.

Having described the invention, I claim:

1. In combination with a wheel hub having slots and an axle boxing, keepers secured to said boxing to extend through the slots when the hub is brought into engagement with the boxing, an annular member journaled on said hub, lugs formed on said annular member to be moved into and out of engagement with the keepers by the rotation of said annular member in opposite directions, racks formed on the annular member, segemental-shaped racks pivoted to the hub and meshing with the first-named racks, and a single operating means carried by the hub and connected to the segmental-shaped racks.

2. In combination with a wheel hub having slots and an axle boxing, keepers secured to said boxing to extend through the slots when the hub is brought into engagement with the boxing, an annular member journaled on said hub, lugs formed on said annular member to be moved into and out of engagement with the keepers by the rotation of said annular member in opposite directions, racks formed on the annular member, segmental-shaped racks pivoted to the hub and meshing with the first-named racks, a feed stem journaled on the hub, a feed nut threaded to the feed stem and held against rotation by the hub, means connecting the nut to the segmental-shaped rack, and a handle formed on the stem.

3. In combination with a wheel hub having slots and an end concaved wall and an axle boxing, keepers secured to the axle boxing and extending through the slots of the hub, a rotatable securing means carried by the hub to be moved into and out of engagement with the keepers, a second boxing formed on the concaved wall of the hub, a feed stem journaled in the second boxing, a feed nut threaded on the feed stem and held against rotation by the second boxing, means connecting the feed nut to the securing means, and a handle formed on the feed stem and lying within the concaved end wall of the hub.

BRENTON B. BRADFORD.